United States Patent
Ando et al.

(10) Patent No.: US 8,009,351 B2
(45) Date of Patent: *Aug. 30, 2011

(54) INFRARED REFLECTIVE MEMBER, AND INFRARED REFLECTIVE DEVICE AND METHOD OF MAKING SAME

(75) Inventors: Hiroaki Ando, Aichi-ken (JP); Takeshi Miyazaki, Aichi-ken (JP); Hiroshi Nakamura, Seto (JP); Masahiko Ishii, Toyota (JP)

(73) Assignee: Toyoda Gosei, Co., Ltd., Aichi-pref. (JP)

( * ) Notice: Subject to any disclaimer, the term of this patent is extended or adjusted under 35 U.S.C. 154(b) by 310 days.

This patent is subject to a terminal disclaimer.

(21) Appl. No.: 12/216,729

(22) Filed: Jul. 10, 2008

(65) Prior Publication Data

US 2009/0015908 A1    Jan. 15, 2009

(30) Foreign Application Priority Data

Jul. 13, 2007  (JP) .................................. 2007-184596

(51) Int. Cl.
*F21V 9/04* (2006.01)
*G02B 5/08* (2006.01)

(52) U.S. Cl. ......................... 359/359; 359/587; 359/599

(58) Field of Classification Search .......... 359/350–361, 359/577–590

See application file for complete search history.

(56) References Cited

U.S. PATENT DOCUMENTS

| 7,083,851 | B2 * | 8/2006 | Faris | 428/323 |
| 7,364,673 | B2 * | 4/2008 | Arsenault et al. | 252/586 |
| 7,760,424 | B2 * | 7/2010 | Takeuchi et al. | 359/359 |
| 2007/0163486 | A1 * | 7/2007 | Hong et al. | 117/68 |
| 2007/0297046 | A1 * | 12/2007 | Takeuchi et al. | 359/359 |

FOREIGN PATENT DOCUMENTS

| JP | A-06-048776 | | 2/1994 | |
| JP | A-2004-027195 | | 1/2004 | |
| JP | A-2005-089244 | | 4/2005 | |
| JP | 2005-325173 | * | 11/2005 | 359/361 |
| JP | A-2006-028202 | | 2/2006 | |

OTHER PUBLICATIONS

English translation of the Japanese reference No. 2005-325173.*
U.S. Appl. No. 12/216,738.

* cited by examiner

*Primary Examiner* — Thong Nguyen
(74) *Attorney, Agent, or Firm* — Posz Law Group, PLC

(57) ABSTRACT

The infrared reflective device includes infrared reflective members which reflect infrared rays. The infrared reflective members include colloidal particles arranged at regular spacing, and a filler material intervening in the spaces between the colloidal particles. The difference between the refractive index of the colloidal particles and the refractive index of the filler material is set so as to be 0.05 or less in the visible light region and 0.1 or above in the infrared region, whereby visible light is transmitted while infrared rays are reflected.

7 Claims, 3 Drawing Sheets

INFRARED REFLECTIVE MEMBER, AND INFRARED REFLECTIVE DEVICE AND METHOD OF MAKING SAME

This application claims the benefit of and priority from Japanese Application No. 2007-184596 filed Jul. 13, 2007, the content of which is incorporated herein by reference.

BACKGROUND OF THE INVENTION

1. Field of the Invention

The present invention relates to an infrared reflective member which transmits visible light while reflecting infrared rays, to an infrared reflective device utilizing the material, and method of making the same.

2. Description of the Related Art

Practicable technologies proposed for reflecting infrared wavelengths contained in sunlight while transmitting the visible light wavelengths include a transparent conductive film of material such as tin oxide (JP 06-048776 A), or a laminate of an oxide or similar material (JP 2005-089244A). However, expensive equipment and complex manufacturing processes can be problems in the manufacture of these films. Another known technology proposes a reflective panel composed of an infrared reflective film of colloidal particles formed on a transparent substrate (JP 2004-027195 A, JP 2006-028202 A). The reflective panel are produced by mixing the colloidal particles with a solvent and applying the mixture onto the transparent substrate to produce an infrared reflective film in which the colloidal particles have a regular arrangement and will reflect specific infrared wavelengths in accordance with Bragg's law. However, where used as window glass or the like, this reflective panel has the problem of low transmittance of visible light, resulting in a dark room.

SUMMARY

An advantage of some aspects of the invention is to prove an infrared reflective member that efficiently reflects infrared rays while having high transmittance of visible light; an infrared reflective device utilizing the member; and a method of making the same.

According to an aspect of the invention, the invention is provided with an infrared reflective member for reflecting infrared rays comprising: colloidal particles arranged at regular spacing; and a filler material intervening between the colloidal particles. The infrared reflective member satisfies a first condition and a second condition in a difference between a refractive index of the colloidal particles and a refractive index of the filler material. The first condition is 0.05 or below in visible light region, and the second condition is 0.1 or above at a wavelength in infrared region whose reflected wavelength exhibits a peak value satisfying the Bragg condition.

In the infrared reflective member pertaining to the present invention, the colloidal particles are arranged at regular spacing, with the filler material intervening between them. When sunlight impinges on such an infrared reflective member, increased reflectivity will be observed at a specific reflected wavelength $\lambda$ peak. Specifically, based on Bragg's law and Snell's law, the reflected wavelength $\lambda$ peak may be expressed by Equation (1) having as a parameter the interplanar spacing d of the (111) planes of the colloidal particles.

$$\lambda\,\text{peak} = 2d(111)(\text{neff}^2 - \sin^2\theta)^{0.5} \quad (1)$$

$\lambda$ peak: reflected wavelength
$\theta$: incident angle
d(111): lattice spacing
neff: effective refractive index That is, the various wavelengths of light contained in incident sunlight can be selectively reflected through differences in interplanar spacing d. Here, the effective refractive index neff is given by Equation (2), from the refractive index of the colloidal particles, the refractive index of the filler material, and the proportions of these materials.

$$\text{neff} = (1-\phi)ns + \phi \cdot n\text{sphere} \quad (2)$$

nsphere: reflectivity of colloidal particles
ns: refractive index of filler material
$\phi$: volumetric proportion of colloidal particles The preceding Equation (1) will be realized in instances where the colloidal particles and the filler material differ in refractive index. The infrared reflective member of the present invention exhibits a difference between the refractive index of the colloidal particles and the refractive index of the filler material, of 0.05 or less in the visible light region; thus a reflected wavelength peak will not be observed and visible light will be transmitted with high efficiency. In the infrared region, however, at the wavelength which satisfies Bragg's law, the difference between the refractive index of the colloidal particles and the refractive index of the filler material is 0.1 or above, and thus a reflected wavelength peak will be observed and infrared rays will be reflected with high efficiency. Herein, a difference between the refractive index of the colloidal particles and the refractive index of the filler material of 0.05 or less in the visible light region refers to a range in which transmittance in the visible light range is 80% or above, i.e. in which there is substantially no decline in the transmitted quantity of visible light. A difference between the refractive index of the colloidal particles and the refractive index of the filler material of 0.1 or above at the wavelength in the infrared region at which the reflected wavelength will satisfy Bragg's law refers to a range in which transmittance at the reflected wavelength is substantially 60% or less, i.e. in which infrared rays are reflected substantially entirely. That is, in view of the fact that the refractive indices of the colloidal particles and the filler material vary depending on the wavelength of light, by employing materials exhibiting refractive indices which are the same in the visible light region but which diverge appreciably upon transitioning from the visible light region to the infrared region, it will be possible to transmit visible light while at the same time reflecting infrared rays.

In another aspect, the present invention provides an infrared reflective device composed of multiple layers of infrared reflective member, wherein the individual infrared reflective members have compositions of different colloidal particle size or compositions of different proportions of colloidal particles and filler material. The reflected wavelength of an infrared reflective member lies within a narrow range defined by Bragg's law, but by varying the particle size and/or the mixture proportions among the individual layers of infrared reflective member as taught herein it will be possible to establish an expanded infrared reflecting region. Specifically, with larger colloidal particle size, the infrared wavelength reflected wavelength $\lambda$ which satisfies Bragg's law will shift towards the longer wavelength end; and if the mixture proportion of colloidal particles is varied, repulsion force among the colloidal particles will become lower, inter-particle distances will become greater, and the reflected wavelength $\lambda$ will be shifted towards the longer wavelength end. Utilizing this characteristic, by laminating multiple layers of infrared reflective members it will be possible to establish an expanded infrared reflecting region.

The colloidal particles employed herein are not limited to any particular material provided that the material can transmit visible light and is substantially spherical in shape; examples include silicon dioxide ($SiO_2$), borosilicate glass, calcium aluminate, lithium niobate, calcite, titanium oxide ($TiO_2$), strontium titanate, aluminum oxide, lithium fluoride, magnesium fluoride, yttrium oxide, calcium fluoride, barium fluoride, zinc selenide, thallium bromoiodide, diamond, and the like. It is also possible to use a ferroelectric body such as lead zirconate titanate (PZT) or lead lanthanum zirconate titanate (PLZT); polyethylene, polyethylene terephthalate, vinyl chloride, acrylic, vinyl oxide, polystyrene, polypropylene, or poly(methyl methacrylate); or silicon or germanium. It is further possible to use a mixture of any two or more compounds selected from polystyrene, poly(methyl methacrylate), $SiO_2$, and $TiO_2$; or a material of core-shell structure having one of these compounds as the core sheathed by a shell of one or more of the other compounds. The regularity of arrangement of the colloidal particles is not limited to any particular form, examples being face-centered cubic, body-centered cubic, simple cubic, or the like, and especially the face-centered cubic structure, i.e. the hexagonal close packed structure.

The filler material may be constituted by a single material or by a mixture of several materials, for example, a mixture of a first resin material (polyethylene glycol #600 diacrylate; NK ESTER A-600 (™) made by Shin-Nakamura Chemical) and a second resin material (methoxy polyethylene glycol #400 acrylate; NK ESTER AM-90G (™) made by Shin-Nakamura Chemical).

In another preferred embodiment the present invention provides an infrared reflective device which includes an infrared reflective member and which has a constitution including a support that transmits visible light and infrared rays wherein the support supports the infrared reflective member; or which has a constitution including a support that does not transmit visible light or infrared rays wherein a coating film is formed on the support, with the infrared reflective being formed over the coating film.

In yet another aspect the present invention provides a method of making an infrared reflective member comprising the steps of: preparing the filler material as a solvent; adding the colloidal particles as a solute to the solvent to prepare a solution; stirring the solution by ultrasound to prepare a colloidal dispersion; and producing a film from the colloidal dispersion to form the infrared reflective member. Through ultrasound stirring it is possible to bring about regular arrangement of the colloidal particles at uniform spacing, and to increase reflectivity. Furthermore, by applying multiple coats of these colloidal dispersions to a support or panel it will be possible to control film thickness; or by applying colloidal dispersions which contain different colloidal particles and/or filler materials, it will be possible to produce infrared reflective members of different kinds.

These and other objects, features, aspects, and advantages of the present invention will become more apparent from the following detailed description of the preferred embodiments with the accompanying drawings.

DESCRIPTION OF THE PREFERRED EMBODIMENTS

The preferred embodiments for carrying out the invention will be described below.
(1) General Configuration of Infrared reflective device 10

Figure 1:
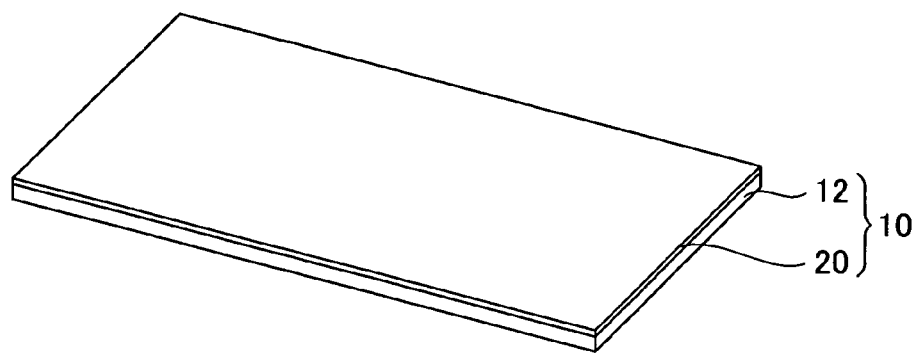
FIG. 1 is a perspective view depicting an infrared reflective device pertaining to an embodiment of the present invention.
Figure 2:
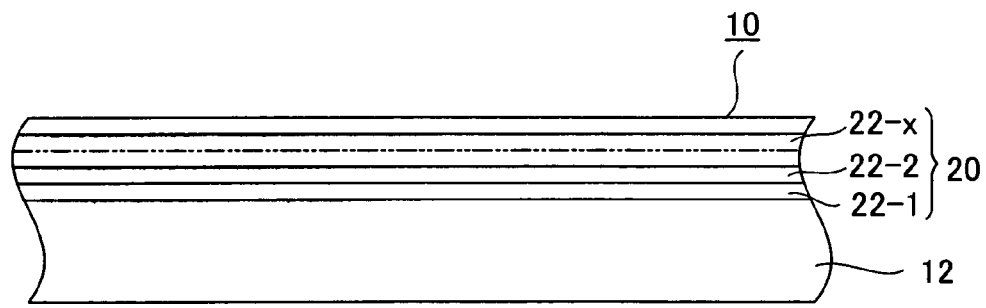
FIG. 2 is an enlarged fragmentary sectional view of FIG. 1.

FIG. 1 is a perspective view depicting an infrared reflective device 10 pertaining to an embodiment of the present invention; and FIG. 2 is an enlarged fragmentary sectional view of FIG. 1. In FIGS. 1 and 2, the infrared reflective device 10 includes a transparent support 12 and an infrared reflective laminate 20 applied over the transparent support 12. The transparent support 12 is a panel capable of transmitting visible light and formed of sheet glass, a transparent resin, or the like. The infrared reflective laminate 20 is composed of a plurality of infrared reflective members 22-1, 22-2, ..., 22-x, ..., 22-n stacked in n layers. Each individual infrared reflective member 22-x has a thickness of between 1 and 1000 μm.

Figure 3:
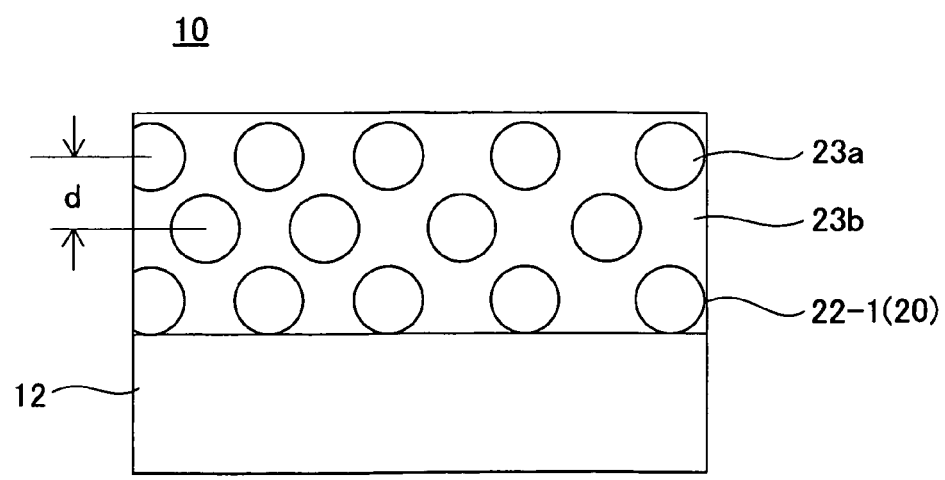
FIG. 3 shows in model form an infrared reflective device having only a single layer of infrared reflective member.

FIG. 3 is an illustration depicting in model form an infrared reflective device 10 having only a single layer of infrared reflective member. The infrared reflective laminate 20 is composed of colloidal particles 23a and a filler material 23b filling the spaces between the colloidal particles 23a. The colloidal particles 23a are arranged at locations similar to the lattice locations in a closed packed structure, but the filler material 23b is present between neighboring colloidal particles 23a so the colloidal particles 23a do not contact one another. Where, for example, $SiO_2$ particles have been employed as the colloidal particles 23a, these will be 300 nm in particle size and arranged at spacing d(111) of 300 nm at the (111) crystal face of the colloidal particles. The filler material 23b is composed of a mixture of a first resin material (polyethylene glycol #600 diacrylate; NK ESTER A-600 ™ made by Shin-Nakamura Chemical) and a second resin material (methoxy polyethylene glycol #400 acrylate; NK ESTER AM-90G (™) made by Shin-Nakamura Chemical), in proportions of 1:9. The colloidal particles 23a are included in a proportion of 50 wt % based on the filler material 23b.

The materials are prepared in such a way that the refractive indices of the colloidal particles 23a and the filler material 23b satisfy the following conditions. Specifically, in the visible light range, the refractive index of the colloidal particles 23a is 1.45, and the refractive index of the filler material 23b is 1.46, with the difference between them being 0.01.
(2) Infrared Reflective Device 10 Production Process Next, a process for making the infrared reflective device 10 will be described. The infrared reflective device 10 can be produced using known processes, such as through the following steps for example. First, a solvent for forming the filler material is prepared. The solvent is obtained by mixing a first resin material with a second resin material. The mixture ratio of the first resin material to the second resin material is 1:9. The first resin material is added for the purpose of accelerating the ultraviolet curing reaction of the second resin material through radical polymerization. Next, the $SiO_2$ particles of 300 nm particle size constituting the solute are added to the solvent in an amount of 50 wt % based on the final colloidal dispersion. Next, as the solution undergoes ultrasound stirring, an ultraviolet curing initiator (DAROCUR 1173 ™ made by Ciba Specialty Chemicals) is added at a level of 2 wt % based on resin weight. A colloidal dispersion is obtained thereby.

Next, a film is produced by applying the colloidal dispersion to a thickness of 1 mm onto the transparent substrate 12, and the film is then irradiated with ultraviolet rays. Additionally, it is acceptable to form the film by applying the colloidal dispersion in multiple coats. Curing the film with ultraviolet rays in this way yields an infrared reflective member in which the colloidal particles are retained by the filler material. The colloidal particles will become arrayed in an autonomous and ordered manner thereby. This step is repeated sequentially using colloidal dispersions of different types. The colloidal dispersions used for this purpose will have different colloidal particle size or mixture proportions with filler material. In this way it is possible to produce an infrared reflective laminate composed of multiple layers of infrared reflective members with different reflected wavelengths.

(3) Operation and Working Effects of Infrared Reflective Device 10

Figure 4:
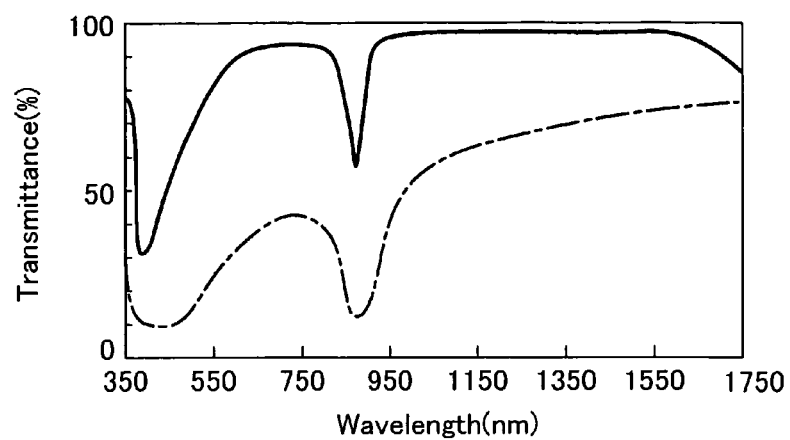
FIG. 4 is a graph illustrating the relationship of transmittance and reflected wavelength due to differences among the materials of the infrared reflective members.

(3)-1 As noted above, Equation (1) will be realized in instances where the colloidal particles and the filler material have different refractive indices. In the infrared reflective member, since the difference between the refractive index of the colloidal particles and the refractive index of the filler material in the visible light region is 0.01 or less, no reflected wavelength peak will be observed. However, at the 870 nm wavelength in the infrared region, the difference in refractive index between the colloidal particles and the filler material will be 0.1 or greater, whereby the reflection conditions of Bragg's law and Snell's law will be realized, a reflected wavelength peak will be observed, and infrared rays can be reflected efficiently. FIG. 4 is a graph illustrating the relationship of transmittance and reflected wavelength due to differences among the materials of the infrared reflective members. The solid line represents the present embodiment, while the dot and dash line represents a Comparative Example equivalent to the prior art, respectively. In the Comparative Example, polystyrene of 40 nm particle size (refractive index: 1.59) is used for the colloidal particles, with the space between the colloidal particles being filled by air (refractive index: 1), since no filler material is used. The spectrum of sunlight includes the ultraviolet region of below 400 nm, the visible light region of between 400 and 780 nm, and the infrared region above 780 nm. As shown in FIG. 4, transmittance of the infrared reflective member pertaining to the embodiment is 80% or above in the visible light region, and 60% or less at the 870 nm wavelength in the infrared region, so transmittance in the visible light region is high. Meanwhile, transmittance of the infrared reflective member of the Comparative Example is 20% or less at the 870 nm wavelength in the infrared region and 40% or less in the visible light region, so transmittance in the visible light region is low. Consequently, where the infrared reflective device of the embodiment is employed for window glass, visible light will pass through the glass and the room will not become dark, yet the infrared rays in sunlight will be blocked so that the cooling effect is undiminished.

Figure 5:
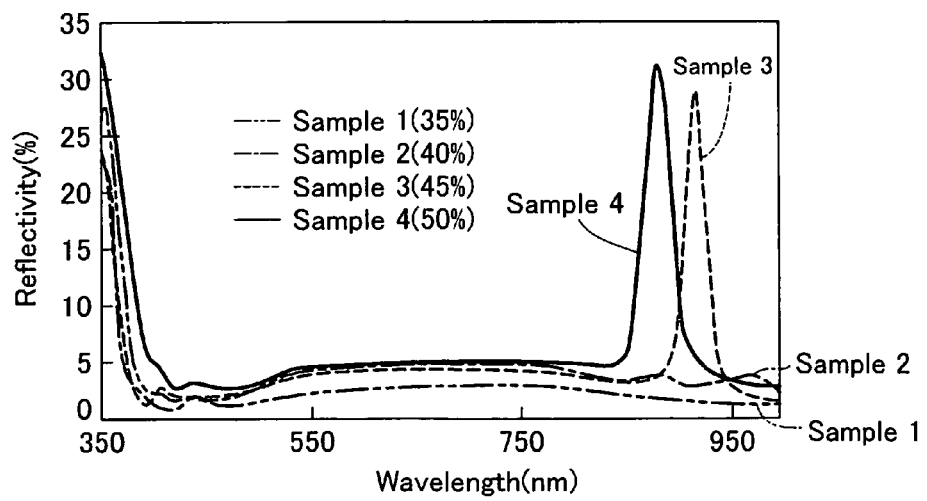
FIG. 5 is a graph illustrating the relationship of reflectivity and reflected wavelength at varying proportions of colloidal particles to filler material.

(3)-2 The infrared reflection range can be expanded by varying the mixture proportions of the colloidal particles and the filler material in each of the layers of infrared reflective member. FIG. 5 is a graph illustrating the relationship of reflectivity and reflected wavelength at varying proportions of colloidal particles to filler material. Here, Samples 1 through 4 are examples in which the proportion of colloidal particles relative to the colloidal dispersion has been set to 35 wt %, 40 wt %, 45 wt %, and 50 wt %. The method of making the infrared reflective member is analogous to that of FIG. 2. As a result, for Samples 3 and 4 in which the mixture proportion [of colloidal particles] is 45 wt % and above, reflectivity in the infrared region is high, and the reflected wavelength in Sample 3 containing the lower proportion is shifted further towards the long wavelength end than in Sample 4; while in the visible light region, reflectivity is held to 5% or less. This is due to the fact that as the mixture proportion of colloidal particles changes, repulsion force among the colloidal particles becomes lower and the inter-particle distances become greater so that the reflected wavelength shifts towards the longer wavelength end. Thus, utilizing this characteristic, by laminating multiple layers of infrared reflective members with the varying mixture proportions given above it will be possible to establish an expanded infrared reflecting region.

Figure 6:
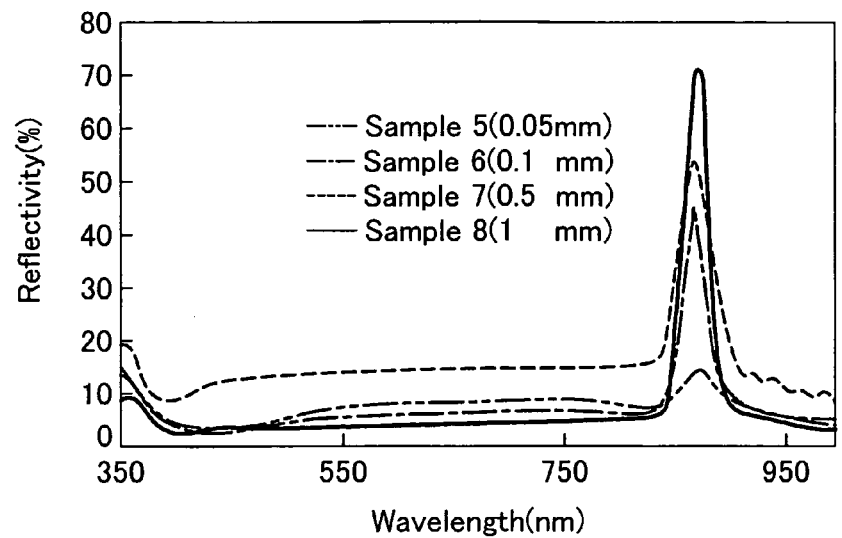
FIG. 6 is a graph illustrating the relationship of reflectivity and reflected wavelength at varying film thickness of the infrared reflective member.

(3)-3 FIG. 6 is a graph illustrating the relationship of reflectivity and reflected wavelength at varying film thickness of the infrared reflective member. In Samples 5 through 8, infrared reflective member film thickness is set respectively to 0.05 mm, 0.1 mm, 0.5 mm, and 1 mm. [In each of the materials,] colloidal particle size is 300 nm, the mixture proportion thereof is 50 wt %, and the infrared reflective member production method is analogous to FIG. 2. As a result, the maximum value of reflectivity was obtained with film thickness of 0.5 mm in Sample 7. However, when film thickness reached 1 mm in Sample 8, reflectivity of the visible light region exceeded 10%, producing a whitish appearance and loss of transparency.

Figure 7:
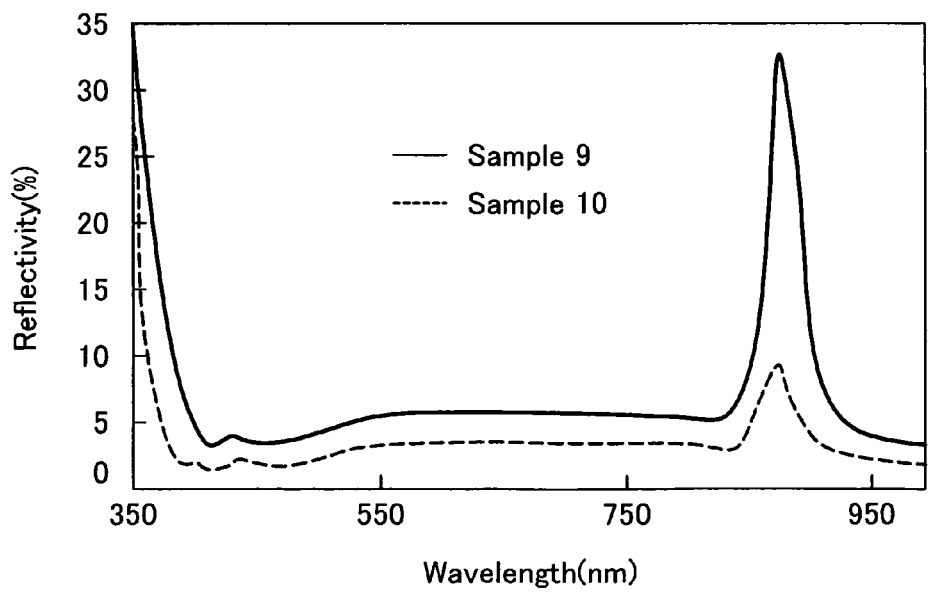
FIG. 7 is a graph illustrating the relationship of reflectivity and reflected wavelength with varying methods of preparing the solution.

(3)-4 FIG. 7 is a graph illustrating the relationship of reflectivity and reflected wavelength with varying methods of preparing the solution. Here, Sample 9 shows a case where stirring was carried out with a stirring bar, and Sample 10 a case where stirring was carried out with ultrasound. As a result, it was found that ultrasound stirring affords increased reflectivity. This is attributed to regular arrangement of the colloidal particles at uniform spacing.

(4) This Invention is not Limited to the Embodiment Described Hereinabove, and Various Modifications such as the Following may be Made Without Departing from the Spirit Thereof.

(4)-1 The infrared reflective member is not limited to being formed on a substrate of glass or the like, and may be utilized in various different modes, such as adhesion as an independent film. For example, the material could be implemented in architectural or automotive window glass by being adhered to a transparent substrate of glass or the like, or sandwiched between multiple panels of glass. The material could also be implemented advantageously in an opaque or translucent support adapted to be touched with the hands, for example, an automobile steering wheel, an arm rest, the lid of a console box or glove box, door handles, and the like, as well as a construction material for walls or the like. For example, where a paint film has been formed on the exterior panels of an automobile and the infrared reflective member then applied in film form over the paint, since the infrared reflective member transmits visible light without attenuation, the color of the paint will be unaffected, that is, without any fading or dulling of the paint color, while at the same time infrared rays will be reflected with high efficiency thereby preventing a rise in temperature of the exterior panels of the automobile and blocking heat to the vehicle interior.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. An infrared reflective device for reflecting infrared rays, the infrared reflective device comprising multiple layers of an infrared reflective member,
    wherein each layer of the infrared reflective member includes:
    colloidal particles arranged at regular spacing; and
    a filler material intervening between the colloidal particles,
    wherein the each layer of the infrared reflective member satisfies a first condition and a second condition in difference between a refractive index of the colloidal particles and a refractive index of the filler material,
    wherein the first condition is 0.05 or below in visible light region, and the second condition is 0.1 or above at a wavelength in infrared region whose reflected wavelength exhibits a peak value satisfying a Bragg condition where at the wavelength in the infrared region infrared rays are reflected with high efficiency.

2. The infrared reflective device in accordance with claim 1, wherein
    the each layer of the infrared reflective member differs in particle size of the colloidal particles.

3. The infrared reflective device in accordance with claim 1, wherein
    the each layer of the infrared reflective member differs in mixture proportion of the colloidal particles and the filler material.

4. The infrared reflective device in accordance with claim 1,
    further comprising a support that transmits visible light and infrared rays and supports the infrared reflective device.

5. The infrared reflective device in accordance with claim 1, wherein at the wavelength in the infrared region infrared rays are reflected substantially entirely.

6. The infrared reflective device in accordance with claim 1, wherein transmittance at the wavelength in the infrared region is 60% or less.

7. A method of making an infrared reflective device for reflecting infrared rays, the infrared reflective device comprising multiple layers of an infrared reflecting member,
    wherein each layer of the infrared reflective member comprises:
    colloidal particles arranged at regular spacing; and
    a filler material intervening between the colloidal particles,
    wherein the infrared reflective member satisfies a first condition and a second condition in difference between a refractive index of the colloidal particles and a refractive index of the filler material,
    wherein the first condition is 0.05 or below in visible light region, and the second condition is 0.1 or above at a wavelength in infrared region whose reflected wavelength exhibits a peak value satisfying a Bragg condition where at the wavelength in the infrared region infrared rays are reflected with high efficiency,
    the method comprises:
    preparing the filler material to serve as a solvent;
    adding the colloidal particles as a solute to the solvent to prepare a solution;
    stirring the solution by ultrasound to prepare a colloidal dispersion; and
    producing the infrared reflective device by applying the colloidal dispersion by multiple coatings to form the multiple layers of the infrared reflecting member.

* * * * *